United States Patent
Hyman et al.

(10) Patent No.: US 8,280,734 B2
(45) Date of Patent: Oct. 2, 2012

(54) SYSTEMS AND ARRANGEMENTS FOR TITLING AUDIO RECORDINGS COMPRISING A LINGUAL TRANSLATION OF THE TITLE

(75) Inventors: Stewart J. Hyman, Richmond Hill (CA); Stephen J. Watt, CedarPark, TX (US)

(73) Assignee: Nuance Communications, Inc., Burlington, MA (US)

( * ) Notice: Subject to any disclaimer, the term of this patent is extended or adjusted under 35 U.S.C. 154(b) by 1125 days.

(21) Appl. No.: 11/464,866

(22) Filed: Aug. 16, 2006

(65) Prior Publication Data

US 2008/0059171 A1  Mar. 6, 2008

(51) Int. Cl.
*G10L 15/26* (2006.01)
*G10L 21/00* (2006.01)
*G06F 17/28* (2006.01)
*H04N 9/80* (2006.01)
*G03B 17/18* (2006.01)

(52) U.S. Cl. ........ 704/235; 704/277; 704/201; 386/241; 396/283

(58) Field of Classification Search .................. 704/235, 704/201, 2; 386/95
See application file for complete search history.

(56) References Cited

U.S. PATENT DOCUMENTS

| | | | |
|---|---|---|---|
| 4,158,750 A * | 6/1979 | Sakoe et al. | 704/251 |
| 4,389,109 A * | 6/1983 | Taniguchi et al. | 396/56 |
| 5,751,906 A | 5/1998 | Silverman | |
| 6,360,011 B1 * | 3/2002 | Katsumata et al. | 382/181 |
| 6,360,750 B1 * | 3/2002 | Gerber et al. | 128/898 |
| 6,868,226 B1 * | 3/2005 | Kwoh et al. | 386/230 |
| 2001/0032070 A1 * | 10/2001 | Teicher | 704/2 |
| 2001/0056342 A1 | 12/2001 | Piehn et al. | |
| 2003/0046085 A1 * | 3/2003 | Wu | 704/275 |
| 2003/0074196 A1 | 4/2003 | Kamanaka | |
| 2004/0243398 A1 * | 12/2004 | Yamada | 704/201 |
| 2005/0038657 A1 | 2/2005 | Roth et al. | |
| 2005/0159957 A1 | 7/2005 | Roth et al. | |

\* cited by examiner

*Primary Examiner* — Talivaldis Ivars Smits
*Assistant Examiner* — Farzad Kazeminezhad
(74) *Attorney, Agent, or Firm* — Wolf, Greenfield & Sacks, P.C.

(57) ABSTRACT

Generally methods for titling segments of recorded audio data are disclosed herein. An input from a voice activation module, a push button input or another user interface can provide a stimulus for a system or device to record title information. The title information can be received as an utterance, converted to text, and linked to a segment or body of recorded audio. A speech to text converter can perform the conversion from audio to text and the text can be displayed to a user. Then, the system can request and accept a confirmation from the user that the title information reflects a user's desires. In a recording retrieval mode, the system can display a plurality of titles with textual characters that represent a lingual translation of the title to the user and prompt the user for a user selection of a title. After such a selection is made, the recorded audio can be retrieved from memory and played back to the user over speakers or headphones.

23 Claims, 3 Drawing Sheets

SYSTEMS AND ARRANGEMENTS FOR TITLING AUDIO RECORDINGS COMPRISING A LINGUAL TRANSLATION OF THE TITLE

FIELD OF INVENTION

The present disclosure is in the field of audio recordings and, in particular, to methods and arrangements for associating a title with recorded audio.

BACKGROUND

Technological advances made over the past few decades in digital computers have led to improvements in related technologies such as digital audio recording devices. These "solid state" digital recording devices have provided many improvements over older analog recording devices. For example, analog audio recording devices typically utilize electro-mechanical measures to drive a tape or some other form of moving recording media. Since newer digital recording devices do not have to mechanically move the recording media, recordings can be located and replayed quickly without having the fast forward or rewind the tape, disc or recording media.

One shortcoming of audio recording devices is their inability to provide effective labels or titles to the numerous recorded segments that can be stored by the device. Some digital recorders allow recorded audio data to be downloaded to a personal computer where the segment of recorded audio can be stored as file, and a name or title can be entered as a file name by entering keystrokes on the keypad of the personal computer. Also many hand held recorders will auto assign a file number to a recorded segment. For example, a recorded may assign a file name of A10 or DS200 to a recorded segment.

When a user attempts to locate a stored file on the recorder, these "canned" or generic file numbers have no subject matter correlation with the contents of the recorded audio. Locating a recorded segment often requires the user to listen to excerpts of the numerous recordings to locate a particular recording because it is hard to associate a generic file name, such as A101 with a particular subject matter. Generally, it is difficult to locate a desired recording unless a user has manually recorded times, dates, counter data, the type of subject matter and other information in a log. Even with a handwritten or typed log it is often difficult for an individual to efficiently retrieve the desired recorded subject matter.

SUMMARY OF THE INVENTION

The problems identified above are in large part addressed by the systems, methods and media disclosed herein to automate titling of recorded audio. To automate such a process, a user can provide a stimulus to a recording apparatus such that the recording apparatus can be placed in a title acquisition mode and record audible title information. The stimulus may comprise activating a switch. The title information can be received as an utterance or speech and the utterance can be converted to text by a speech to text converter. The text can then be associated with the main body of the recorded audio. After the audio title is uttered, the textual version of the title can be displayed to the user and the recorder can request a user to confirm the textual title as acceptable. The system can accept a confirmation from the user that the textual title is satisfactory or that the title reflects the user's desire. When a user wants to locate a recorded segment, the system can display a plurality of titles in textual format, and when a user selects one of the displayed titles the system can provide sound recorded as the main body of the recording to the user.

In another embodiment, a user can configure a title acquisition time period. During this time period the recording device can record/acquire an audible title from the user and convert the audio to a digital format. Thus, during this time period, the user can speak the title and the system can convert the audio provided by the user to text and associate this textual title with a body of the recording. The recording device can provide an audible indicator such as "beeps" or tones to indicate the beginning and end of the title acquisition time period. In other embodiments a user can hold down a "title" button while speaking the title and let up on the button upon completion of speaking the title, and the system can utilize such a stimulus to acquire the intended audio title. In other embodiments, a voice activation module and a speech recognition module can determine when the user is creating an audio command by utilizing a speech recognition module to identify "command words." For example, if a user states something like "create title" (i.e. command/recognized words) then the system can act on this audio command and subsequent to the command record title information in a title acquisition mode. When the system recognizes the words "end of title," the system can cease acquiring or recording title information and terminate the title acquisition mode. To perform such an automated titling function, the voice activation module can activate a speech to text module and a text comparator to accomplish such a conversion. When the system recognizes the command in text format substantially matches the stored text, the system can perform a function responsive to such a process.

In another embodiment, an apparatus for titling recordable audio is disclosed. The apparatus can have an input module to receive an audio signal representative of a title. A speech to text converter can convert the spoken audio into a textual title, memory can store the title and a linking module can link the textual title with the body of the recording. For confirmation of the auto conversion, a text to speech converter can provide audio feedback to the user such as "do you approve of the title, Interview With Jon Ram," and the system can accept a verbal confirmation from the user.

In yet another embodiment a computer program product is provided that includes a computer useable medium having a computer readable program, wherein the computer readable program when executed on a computer causes the computer to receive a stimulus to record title information. The title information can be received in an audio format, converter to text, and associated with a body of recorded audio. The code can also cause the computer to display the textual title and request user approval. In addition when a user desires to locate a recording, the computer can display titles and a user can select the displayed titles and select a title to activate a playback of the body of the recording.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

Figure 1:
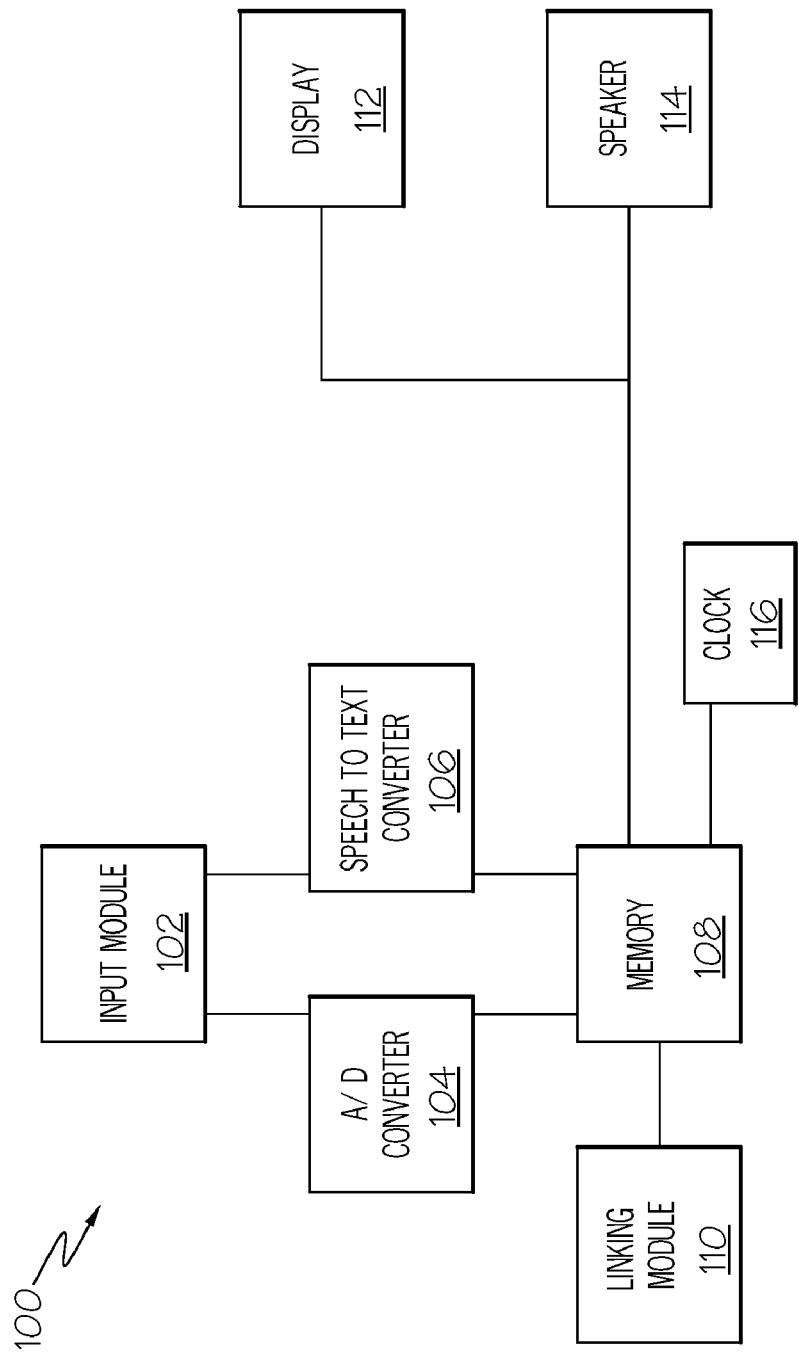
FIG. 1 depicts a block diagram of an auto-titling apparatus.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims. The descriptions below are designed to make such embodiments obvious to a person of ordinary skill in the art.

While specific embodiments will be described below with reference to particular configurations of hardware and/or software, those of skill in the art will realize that embodiments of the present invention may advantageously be implemented with other equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Generally, methods and arrangements for automatically titling segments of recorded audio with a textual title are disclosed herein. A user input can provide a stimulus for a device to record audio based title information for an audio recording. The audio based title information can be received as an utterance and the utterance can be converted into text or a series of textual characters that can form a word or a series of words. The word, words, or series of textual characters can then be associated with a recording to title the recording. A speech to text converter can perform the conversion of the utterance to text and the text can be displayed to a user for approval. The title can be processed and recorded at any time. For example, the title can be recorded before, during or after the body of the recording and an association, a link and/or index can be established between the body of the recording and the title, either automatically or in accordance with input from a user. The acquired title can be displayed in textual format to the user such that the user can accept or reject the title via the buttons on the user interface.

When a user desires to locate a recording, the user can request that the device display selectable titles on a display. In response to a user input of title selection, the device can play the audio that is associated with the displayed title. In other embodiments a menu driven process of a graphical user interface could be utilized for recording and retrieving titles and managing the record subject matter. Alternately, instead of providing a textual title the apparatus could provide an audio version of the textual title to the user via a text to speech converter.

In one embodiment an apparatus for titling recordable audio is disclosed. The apparatus can be a small, handheld, battery powered, solid state recorder. The recorder can have an input module to receive audio representative of a title and a speech to text converter to convert the audio into text representing the title. The recorder can also have a linking/indexing module to link the title to recorded audio and index the title and the recorded audio to a location within the memory such that the title information can be associated with the body of the recording.

Referring to FIG. 1 an apparatus such as a hand held personal recorder that can auto-title an audio recording is disclosed. The apparatus can include an input module 102, an analog to digital converter 104, a speech to text converter 106, memory 108, a linking/association module 110, a clock 116, a display 112 and a speaker 114.

The input module 102 can be embodied as a transducer or a microphone that can convert sound waves into an analog electrical signal. The electrical signal can be amplified by an amplified in the input module 102. The analog signal can be converter to a digital signal by analog to digital converter 104.

The apparatus 100 can have two modes when operating. In one mode a user can record audio such as an interview, and in another "title acquisition" mode the apparatus can process and record title information. Thus, before, during, or after recording audio a user can decide to create a title for the audio recording. These modes can be set up, started, and stopped in many ways. For example, depressing a button that is part of the input module 102 could place the apparatus into a title recording mode and depressing another button on the input module 102 could put the apparatus in a mode to record the body of the interview.

When the apparatus 100 is in title acquisition/recording mode the user can utter or speak words that can be utilized to title to the body of an audio recording or a soon to be recorded audio recording. The title acquisition mode may only last for a predetermined amount of time as determined by clock 116. The utterance can be received by the input module 102 and the analog to digital converter 104 can convert the utterance into a digital signal representing the utterance. The digitized utterance can be stored in memory 108. The digital utterance can be retrieved from memory 108 by speech to text converter 106 which can convert the utterance to some form of text and the text can also be stored in memory 108.

Subsequently, the stored text can indexed and associated with, and linked to a section of memory that will store or has stored the associated audio recording. Such a link can be provided by linking module 110. Linking module 110 can index the location in memory 108 that stores the text and can index the location in memory 108 that stores the recording. Thus, all titles can be stored in a known area in memory 108 such that they are easy to locate when a user wants to view titles on display 112. In other embodiments the linking module 110 can store an index of where the titles reside in memory 108 such they can be easily accessed.

To activate a body recording mode, such that the actual body of the recording can be made, a user can provide a different control stimulus than the one utilized to activate the title acquisition/auto-titling mode. When the recording mode is activated, the user or another source of audio in the presence of the input module 102 can continually speak or produce sounds and the microphone of the input module 102 and the analog to digital converter 104 can provide a digital representation of the speech, noises, music, sounds etc to be stored in memory 108.

After the sounds are stored in memory 108 as the body of the recording and a title has been associated with the body, the user can display titles and select titles for playback of a the body associated with the title. When a title is selected for re-play by a user via interaction between the input module 102, and the display 112, the body of the recording can be sent to the speaker 114 and a high fidelity reproduction of the recorded sounds in the body of the recording can be provided back to the user.

Figure 2:
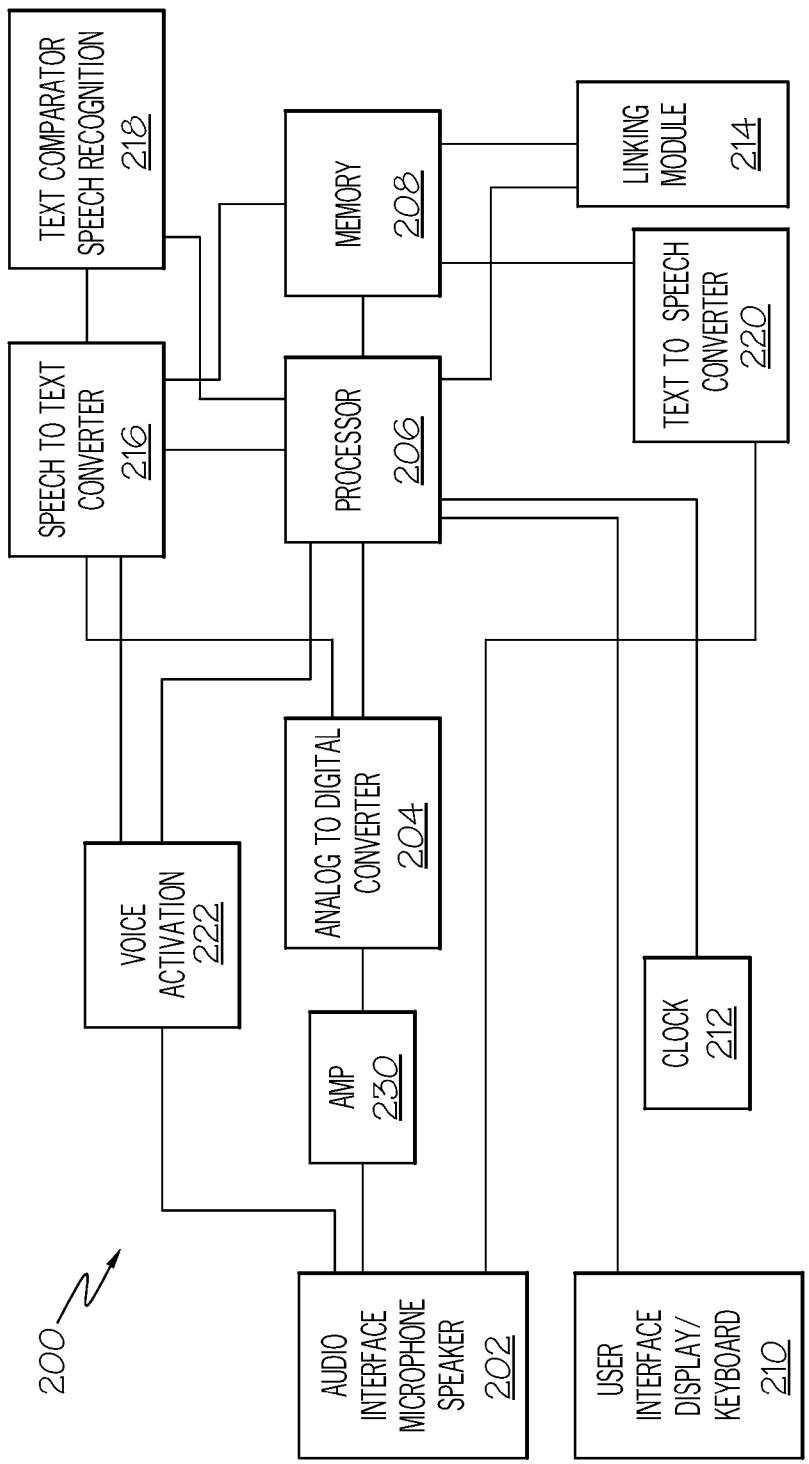
FIG. 2 depicts a block diagram of a textual titling system for audio recordings.

Referring to FIG. 2, an automated textual titling system/apparatus 200 for recorded audio is disclosed. The system can include, generally, an audio interface 202, an amplifier 230, a user interface 210, a voice activation module 222, an analog to digital converter 204, a clock 212, a speech to text converter 216, a text comparator/speech recognition module 218, a processor 206, memory 208, a text to speech converter 220 and a linking module 214.

The audio interface 202 could be a transducer such as a microphone, a speaker or both. Generally, the audio interface 202 can transform sound waves into analog electrical signals and transform electrical signals into sound waves. The analog electrical signals from the microphone can have a relatively small amplitude and the amplifier 230 can amplify the electrical signal to raise them to levels that are compatible with signal processing sub-systems.

Also, the analog to digital converter 204 could also perform as an digital to analog converter and the audio that is stored digitally by memory 208 can be sent to the digital to analog converter where it can be converter into an analog signal. The analog signal could be amplified by amplifier 230 to turn the signal into a powerful signal having many watts to drive a speaker, multiple speakers, head phones or any other sound producing device indicated by audio interface 202.

The user interface 210 could be a display, such as a liquid crystal display, a touch screen, a keyboard, of just a series of push buttons. The audio could be an utterance, simple speech, music or some other classification of audible content or sound waves. The system/apparatus 200 could be embodied as a small hand held portable device, a personal computer, or a large powerful computer.

In operation, a user desiring to record some audio, can provide some form of an indicator or stimulus to the system/apparatus 200, indicating that the user will be uttering a title. For example, the user may hold down on a title button, that is part of the user interface 210 during verbalization of a title. When holding down the title button, and placing the system in a title acquisition mode, the user can speak a title that the user wishes to assign to a subsequent recording. When the "title" button is released, the processor 206 can mark, tag, or index the received segment of audio as a title.

In another embodiment, a user can specify a length of time from the start of the recording of the title to the end of the recording of the title and the system/apparatus 200 could provide visual cues to delineate such a time frame. Alternately, the predetermined time interval can be indicated with "beeps" via audio interface 202. Thus a "beginning beep" and an "ending beep" can mark a time period for a title acquisition process.

After such a process, the system/apparatus 200 could continue and accept the body of the recording. Such an auto-titling process could allow title information to be entered before during or after the recording of the body is provided. The utterance provided as the title can be converted from its analog form to a digital form by analog to digital converter 204. The speech to text converter 216 can utilize the digitized title to create a title in textual form. The textual form can be a series of textual characters having a specific typeface that can form words. The words or series of textual characters can be utilized as the title of the recording.

In one embodiment textual form or text characters can included characters that comply with the American Standard Code for Information Interchange (ASCII) format. Such a format has a standard 8 bits that represent alpha and numeric characters and a series of ASCII compliant characters can create the text form or the series of textual characters that represent a title displayable to the user. Other data formats that can digitally represent alpha characters or numeric characters would not part from the scope of the present disclosure. The textual title can be displayed on user interface 210 and the user can confirm, via the user interface 210, that the auto-titling or text provided by the system/apparatus 200 is acceptable to the user.

In one embodiment, to create a title a user may hold the title button down and say "deposition of Jeff Schuber." Upon release of the title button, the text "Deposition of Jeff Schuber" could appear on the display of the user interface 210. Subsequently, a record button on the user interface 210 could be activated by the user, and the audio that follows could be recorded and automatically associated with/indexed and linked to the displayed title by linking module 214.

It can be appreciated the numerous ways for entering and verifying the title information could be utilized without parting from the scope of the present disclosure. For example, the interaction for titling audio segments, for providing feedback of title information, and for locating titled recordings could be performed exclusively with system based verbal prompts, eliminating the need for a display. In one embodiment, in response to a user input such as the activation of a record button, the audio interface 202 could recite "please speak a title for the recording."

Accordingly, for a predetermined amount of time, as determined by clock 212 or the voice activation module 222, the system/apparatus 200 could record title information and create a textual representation of the audio based title information provided by the user during this time period. Subsequently, the audio interface 202 could recite you may now make a recording and a body of the recording could be made.

In another embodiment, when the system/apparatus 200 is on, and possibly recording a clip, speech recognition module 218 can recognize words spoken by a user such as "begin title" and when this combination of command words are recognized by the system/apparatus 200, the system/apparatus 200 can record a textual title and when the speech recognition module 218 recognizes the words "end title" the system/apparatus 200 can end the acquisition of the title. Accordingly, the digitally stored audio files and titles could be stored in memory 208 and indexed and linked by linking module 214. Memory 208 could also store instruction to be executed by processor 206 or other modules.

After a textual title is entered into the memory 208, many different methods of accepting or confirming the text that results from the user input could be utilized. For example, the text to speech converter 220 could provide, via amplifier 230 and audio interface 202, "You have provided the system with the title "Deposition of Jeff Schuber" if this is correct, say "correct" if you would like to change this title, say "change,"" and the system/apparatus 200 could iterate until the user is satisfied with the auto-generated textual title. In another embodiment, the textual title could appear on the display of the user interface 210, and the display could prompt the user for input such as a keyboard input from the user interface 210 to verify that the title provided by the system/apparatus 200 is acceptable to the user.

Figure 3:
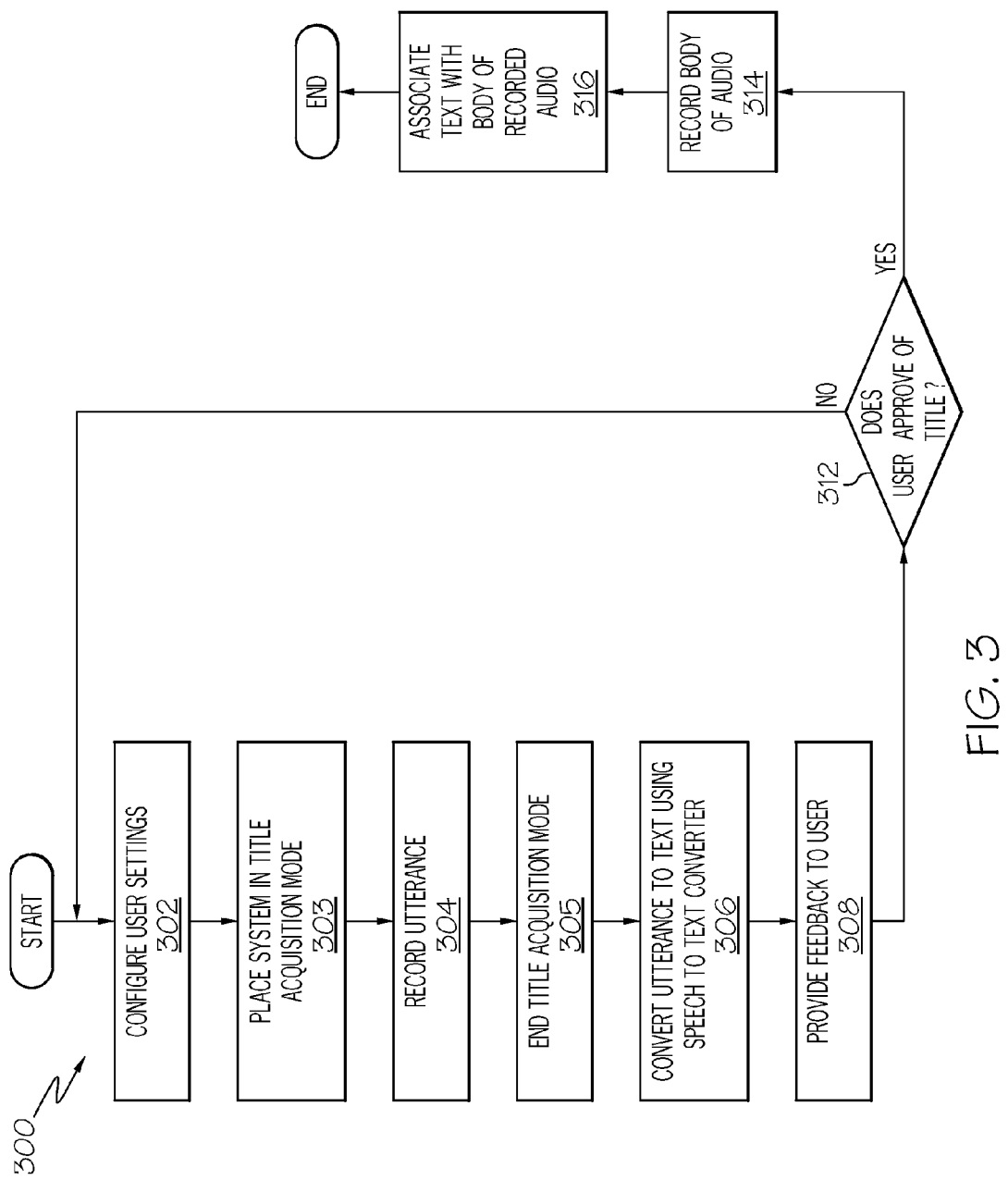
FIG. 3 depicts a flow chart depicting one method for textually titling recorded audio.

Referring to FIG. 3 a flow chart of a method 300 for auto-titling a recording with a speech to text converter is disclosed. Initially, a user can configure user settings for numerous user configurable parameters. For example, a user could select an auto-titling mode where the title is acquired during an initial time period of the recording and the duration or length of the time period can also be user configurable. When this setting is selected or configured, and a "record" button is pushed, a title acquisition mode is automatically commenced as illustrated by block 303 and the system can convert the initial utterance of a title to text and when the user selected time period expires the system can provide a "beep" indicating the end the title acquisition mode/text conversion process and the system can immediately begin recording the body of the recording. The text can be a lingual translation of the utterance into, for example a grammatically correct sentence.

In other embodiments the system can be placed in title acquisition mode by pressing a "create title" button. The user could also place the recorder in title acquisition mode by speaking a verbal request that can be understood by the voice recognition system of the recorder. The recorder could also prompt the user or notify the user that the recorder is in a title acquisition mode in response to the user commencing a recording by depressing a record button. This title acquisition mode could occur before, during or after a recoding of the body of the recording that is, or will be titled.

When the system is in a title acquisition mode, user input (I/P) such as an utterance could received by a microphone, converted to a digital signal and stored into memory as illustrated by block 304. The analog electrical signal produced by the microphone in response to the utterance can be converted into a digital signal by an analog to digital converter and the digital signal or data can be stored in memory. The title acquisition mode could be ended as illustrated by block 305. As described above, many different stimulus could trigger such an end to the title acquisition mode. For example activation of a button, the time out of a timer, or a speech command could trigger the end or deactivation of a title acquisition mode.

The digital format of the utterance stored in memory could be converted into a string of textual characters representing a title by a speech to text converter, as illustrated by block 306. The resulting text could be provided to the user as feedback on a display of the device as illustrated by block 308. In alternate embodiments, an audible feedback from a text to speech converter could be provided to the user in a "title confirmation" process.

The user could be prompted to determine if the user approves of the title at decision block 312. If the user does not approve of the title, the process can revert back to block 302, where the user can again be prompted for a title. If the user approves of the title, then the body of the audio can be recorded as illustrated by block 314. Notwithstanding the time frames when the title and the body have been made, the title and the body of the recorded audio can be indexed and linked as illustrated in block 316. The process can end thereafter.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present invention, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods, systems, and media that allow a user to auto-title an audio recording. It is understood that the form of the invention shown and described in the detailed description and the drawings are to be taken merely as examples. It is intended that the following claims be interpreted broadly to embrace all the variations of the example embodiments disclosed.

What is claimed is:

1. A method for titling a recording comprising:
    receiving a stimulus to commence a title acquisition mode;
    receiving an utterance representing a title during the title acquisition mode;
    converting the utterance into a series of textual characters using a speech to text converter, wherein the textual characters represent a lingual translation of the utterance;
    storing the series of textual characters representing the title in memory;
    automatically commencing a recording mode a predetermined time after the title acquisition mode is commenced;
    receiving a body of a recording during the recording mode;
    storing the body of the recording in memory; and
    automatically linking the series of textual characters representing the title with the body of the recording in memory to title the body of the recording.

2. The method of claim 1, wherein the stimulus comprises an audio command.

3. The method of claim 2, further comprising:
converting the audio command into text;
comparing the text to stored text; and
recognizing the text as a command based on the text substantially matching the stored text.

4. The method of claim 3, further comprising performing a function based on the recognizing that the text matches stored text.

5. The method of claim 1, further comprising indexing the body of the recording and the title.

6. The method of claim 1, further comprising:
displaying a plurality of titles;
prompting the user for a user selection of a title from the plurality of titles;
receiving a user selection; and
providing audio of the linked recording in response to the selection of the title.

7. The method of claim 1, further comprising:
converting the series of textual characters representing the title into a speech signal;
audibly reproducing the speech signal; and
accepting a confirmation from a user that the title is acceptable to the user.

8. The method of claim 1, wherein the stimulus comprises an indication of activation of a switch.

9. The method of claim 1, further comprising:
displaying, prior to accepting the confirmation from the user, the series of textual characters representing the title.

10. The method of claim 1, wherein a length of title acquisition mode is user-configurable.

11. The method of claim 1, further comprising:
displaying the series of textual characters representing the title to a user to confirm the series of textual characters are an accurate conversion of the utterance; and
accepting a confirmation from the user that the series of textual characters representing the title is an acceptable conversion of the utterance to the user.

12. An apparatus for titling recordable audio comprising:
an input module to receive audio representative of a title during a title acquisition mode and to receive a body of a recording during a recording mode, wherein the apparatus is configurable in an auto-titling mode in which the recording mode is automatically commenced a predetermined time after the title acquisition mode is commenced;
a speech to text converter to convert the audio into textual characters representing the title, wherein the textual characters represent a lingual translation of the audio; and
memory to store the body of the recording and the title.

13. The apparatus of claim 12, further comprising:
a transducer to convert the audio into an analog electrical signal; and
an analog to digital converter to convert the analog signal into a digital signal.

14. The apparatus of claim 12, further comprising a clock module to determine when the predetermined time has elapsed.

15. The apparatus of claim 12, further comprising a text to speech converter to provide an audio indicator of the text representing the title.

16. The apparatus of claim 12, wherein a length of title acquisition mode is user-configurable.

17. The apparatus of claim 12, further comprising:
a display to present the textual characters to a user to confirm the accuracy of the speech to text converter; and
a user interface configured to receive an indication from the user that the textual characters representing the title are an acceptable conversion of the utterance to the user.

18. The apparatus of claim 12, wherein the apparatus is a handheld, battery powered, solid state audio recorder.

19. A non-transitory computer-readable storage medium having computer-readable instructions, wherein the computer-readable instructions when executed on a computer cause the computer to:
commence a title acquisition mode;
receive an utterance representing a title during the title acquisition mode;
convert the utterance into a series of textual characters, wherein the textual characters represent a lingual translation of the utterance;
store the series of textual characters representing the title in memory;
automatically commence a recording mode a predetermined time after the title acquisition mode is commenced;
receive a body of a recording during the recording mode;
store the body of the recording in the memory; and
automatically link the series of textual characters to the body of the recording in the memory to title the body of the recording.

20. The non-transitory computer-readable storage medium of claim 19, wherein the computer-readable instructions when executed on a computer cause the computer to:
display the series of textual characters representing the title; and
accept a confirmation from a user that the title is acceptable to the user.

21. The non-transitory computer-readable storage medium of claim 19, wherein the computer-readable instructions when executed on a computer cause the computer to:
convert the series of textual characters representing the title into a speech signal;
audibly reproduce the speech signal; and
accept a confirmation from a user that the title is acceptable to the user.

22. The non-transitory computer-readable storage medium of claim 19, wherein the predetermined length of title acquisition mode is user-configurable.

23. The non-transitory computer-readable storage medium of claim 19, wherein the computer-readable instructions when executed on a computer further cause the computer to:
display the series of textual characters representing the title to a user to confirm the series of textual characters are an accurate conversion of the utterance; and
accept a confirmation from the user that the series of textual characters representing the title is an acceptable conversion of the utterance to the user.

* * * * *